M. F. KETTLER.
RESILIENT WHEEL.
APPLICATION FILED JULY 19, 1913.
1,197,213.
Patented Sept. 5, 1916.
4 SHEETS—SHEET 2.
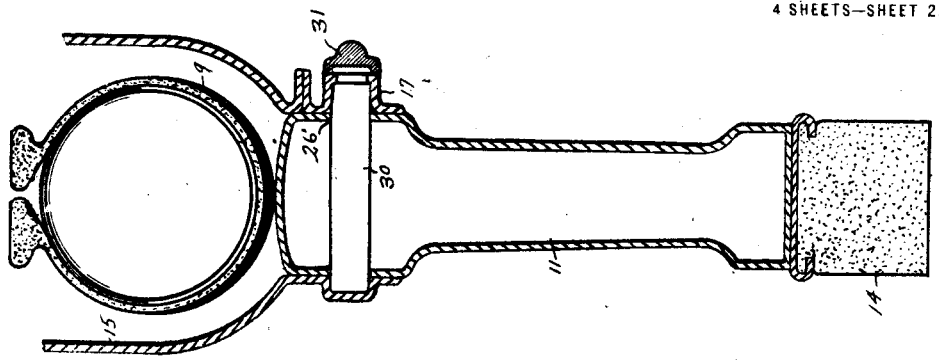
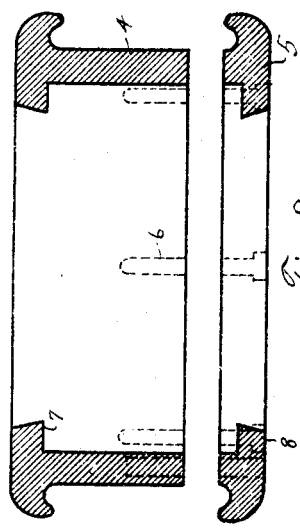
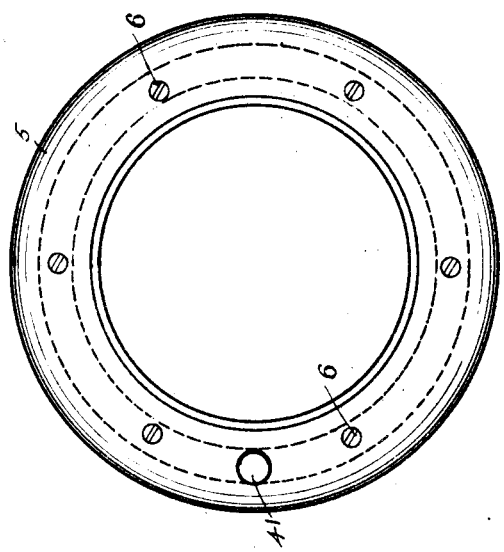
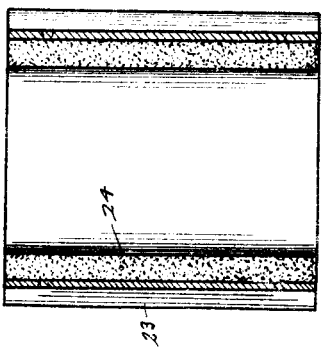
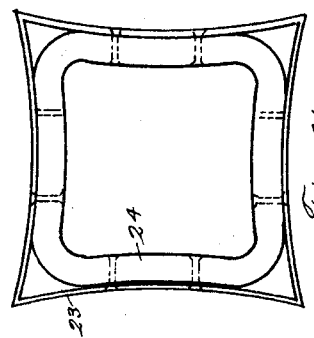

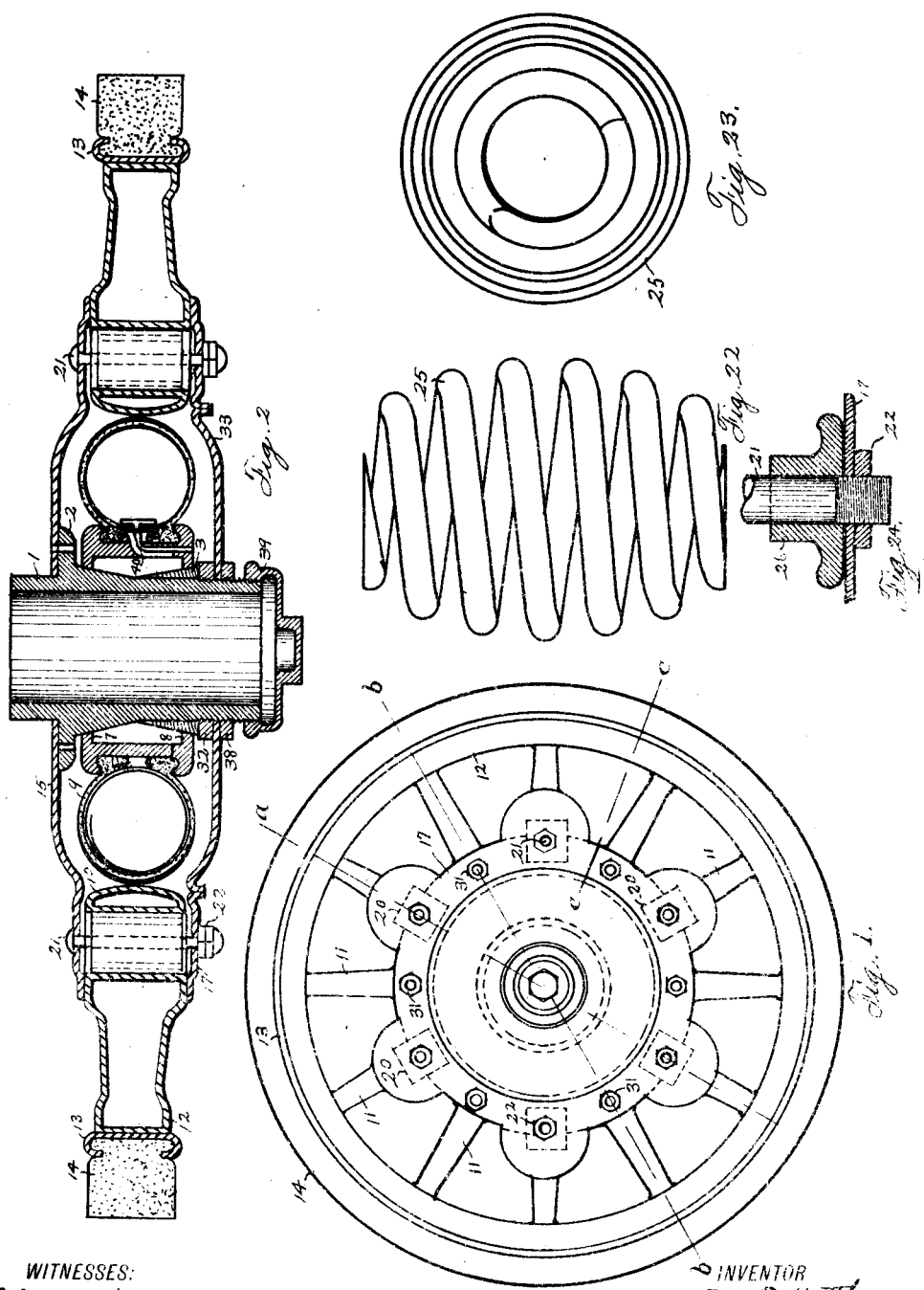

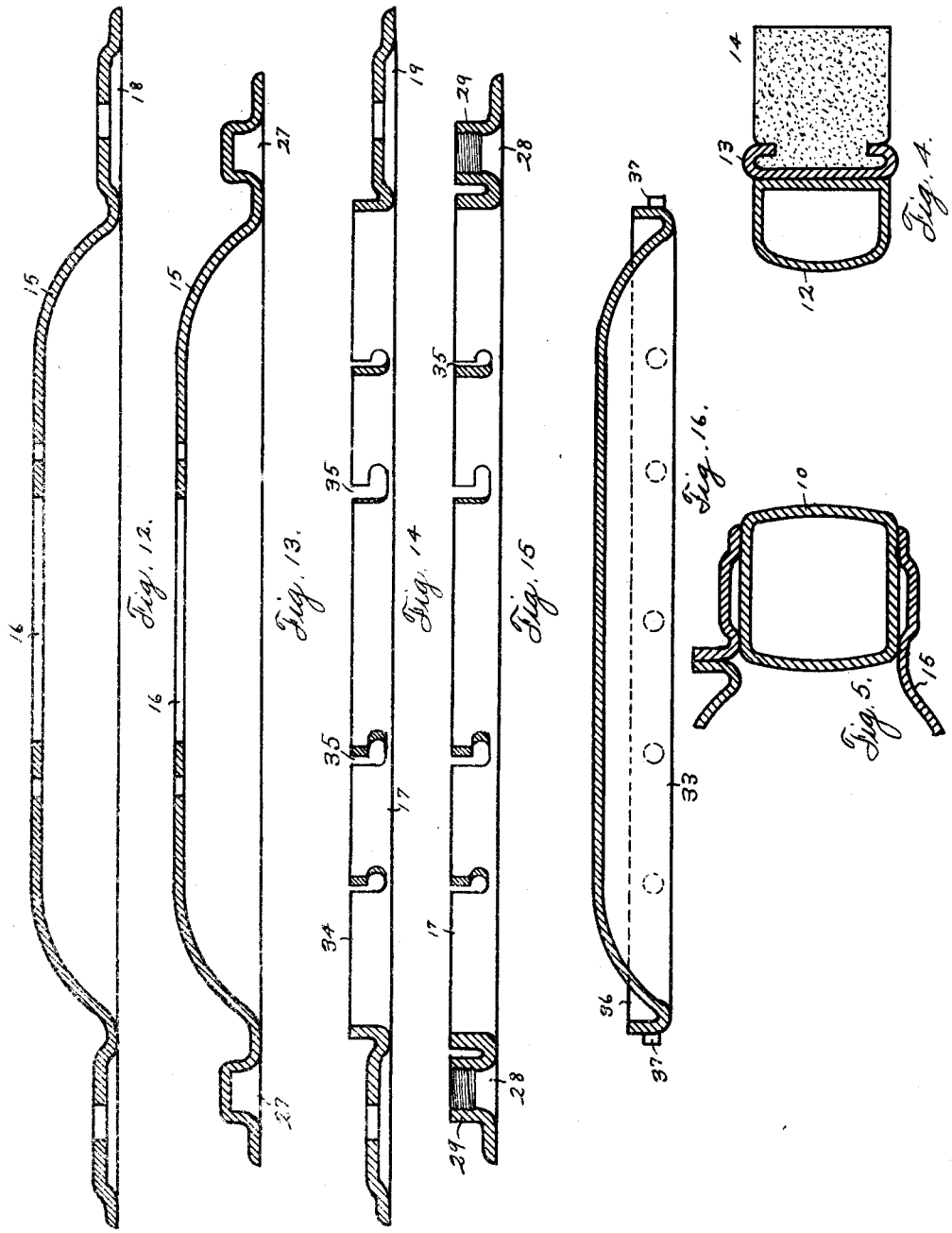

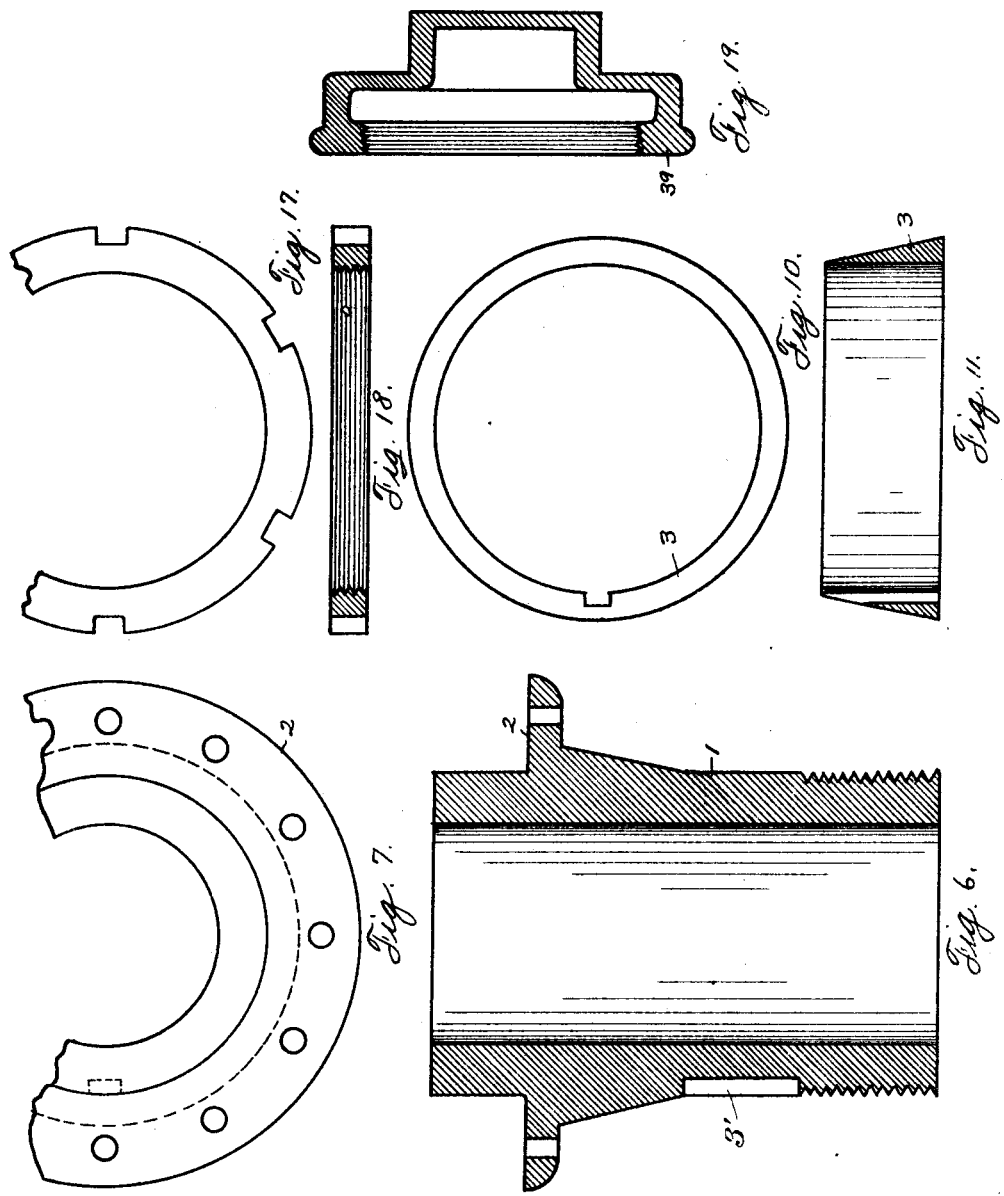

UNITED STATES PATENT OFFICE.

MARTIN F. KETTLER, OF HOUSTON, TEXAS, ASSIGNOR TO DOWNING PNEUMATIC WHEEL COMPANY, OF HOUSTON, TEXAS, A CORPORATION OF ARIZONA.

RESILIENT WHEEL.

1,197,213.      Specification of Letters Patent.      Patented Sept. 5, 1916.

Application filed July 19, 1913. Serial No. 780,018.

*To all whom it may concern:*

Be it known that I, MARTIN F. KETTLER, a citizen of the United States, residing at Houston, in the county of Harris and State of Texas, have invented certain new and useful Improvements in Resilient Wheels, of which the following is a specification.

This invention relates to resilient wheels and particularly to that class of wheels wherein a pneumatic cushion is disposed between the hub and the rim or felly for the purpose of receiving the impact or thrust of the spokes as the vehicle moves along.

The general object of this invention is to improve the construction of wheels of this character so that they may be more cheaply and easily manufactured and the parts may be more readily assembled or taken apart.

A further object is to so construct the wheel that its resiliency will be increased both in relation to the common pneumatic tired wheel and in relation to wheels where the pneumatic cushion is disposed between the hub and rim.

A further object is to so construct the wheel as to provide an outer section, movable with relation to the central or hub section radially, tangentially and circumferentially and an intermediate pneumatic cushion, and in this connection to so construct this wheel that while the hub section and outer rim section, or felly, will always have driving engagement with the hub, yet the rim section will have a certain freedom of movement radially and tangentially whereby the wheel is cushioned against vertical and direct jars and shocks and also shocks delivered in lines extending upward and rearward through the wheel, as when the wheel engages with a relatively high obstruction.

A further object is to provide a pneumatic cushion of the clencher type and provide a bearing ring, so constructed as to clench over the flange of this pneumatic tube or cushion to thereby engage the pneumatic cushion with the ring and hold the split or joint of the tube closed.

A further object is to provide a bearing ring for the pneumatic cushion so constructed that the cushion may be readily removed from the hub and when removed may be also readily replaced thereon and means for securely locking said ring on the hub.

A still further object is to provide in connection with the ring and tube an air pipe or inlet through which air may be forced for the purpose of inflating the pneumatic cushion.

A further feature of the invention resides in the provision of an inclosing plate provided to protect the pneumatic cushion and which may be readily secured in position on the hub and as readily removed when access is sought to said cushion, said plate being spaced from the cushion when in position so as not to contact therewith.

A further object in this connection is to provide a plurality of power transmission or connecting members connecting the hub to the outer section and which are cushioned so that as power is transmitted from the hub to the outer section the clashing of parts will be minimized and the wheel thereby rendered practically noiseless.

A further object is to so construct the wheel that it may be made of sheet metal sections so designed that maximum strength with minimum weight is secured, and to form the wheel with hollow tubular sheet metal spokes connected in a simple yet efficient manner to the rim and to the intermediate section.

A still further object is to secure in a wheel having an annular cushion disposed between the rim portion and the hub, the freest possible action of the cushion so that it may be permitted to rotate relative to the hub and so that it will absorb the largest proportion of the shock possible.

With the above and other objects in view, the invention has particular relation to certain novel features of construction, operation and arrangement of parts, an example of which is given in this specification and illustrated in the accompanying drawings wherein:—

Figure 1 is a side elevation of the wheel viewed from the outer side thereof. Fig. 2 is a sectional view taken on the line *a—a* of Fig. 1. Fig. 3 is a partial sectional view taken on the line *b—b* of Fig. 1. Figs. 4 and 5 show partial sectional views of the outer and center sections, respectively, of the wheel, taken on the line *c—c* of Fig. 1. Fig. 6 shows a sectional view of the hub. Fig. 7 shows a fragmentary end view of the inner end of the hub. Fig. 8 shows a sectional view of the bearing ring for the pneumatic cushion, the parts thereof being shown spaced apart. Fig. 9 shows an inner end view of said ring. Figs. 10 and 11 show, respectively, end and sectional views of a wedge shaped ring employed for the purpose of locking the bearing ring, shown in Figs. 8 and 9, on the hub. Figs. 12 and 13 show sectional views of the inner or transmission plate connecting the central or hub section to the outer section, taken on the lines a—a and b—b, respectively, of Fig. 1. Figs. 14 and 15 show sectional views of the connecting ring, taken, respectively, on the lines a—a and b—b of Fig. 1. Fig. 16 is a sectional view of the outer or protecting plate. Figs. 17 and 18 show, respectively, a fragmentary plan view and a sectional view of a form of locking ring employed to lock said outer plate, shown in Fig. 16, in a fixed position on the hub. Fig. 19 shows a sectional view of the screw cap which is provided to fit over the outer end of the hub. Figs. 20 and 21 show, respectively, sectional and end views of the cushion for cushioning the power transmission members. Figs. 22 and 23 show, respectively, side elevation and end views of another form of said cushioning device, and Fig. 24 shows a sectional view of a bearing member designed to be used in connection with the form of cushioning device shown in Figs. 22 and 23.

Referring now more particularly to the drawings, wherein like numerals of reference designate similar parts in each of the figures, the numeral 1 refers to the hub which is a metallic tubular member designed to be secured upon the end of the vehicle axle. The outer end of this hub is outwardly threaded and near the inner end thereof the hub is provided with an annular flange 2 for a purpose to be hereinafter stated. This hub is substantially of uniform diameter from end to end with the exception that from about the mid portion thereof to the inner side of the flange it gradually thickens in dimensions so as to give that portion of the hub a frusto-conical form.

The numeral 3 designates a wedge shaped ring which is designed to be slidable over the threaded end of the hub, the thick portion outwardly. This ring has a key way in its inner wall, which when the ring is in position coincides with a corresponding key way in the periphery of the hub and when said ring is placed in position on the hub it may be locked against turning by means of a key 3' which rests in said key ways, said wedge shaped ring being shown in position on the hub in Fig. 2. A two part bearing ring is provided, the parts thereof being indicated by the numerals 4 and 5 and said parts being secured together by means of set screws, as 6, indicated in dotted lines in Fig. 8. This bearing ring surrounds the hub and has inwardly extending flanges 7 and 8 at its respective ends, the former of which rests upon the conical portion of the hub up close to the flange 2 and the latter of which rests upon the wedge shaped ring 3 and the bearing ring is permitted to turn upon the hub in the manner and for the purpose hereinafter explained. The hub having a section thereof frusto conical in shape and having a wedge shaped ring thereon opposing this frusto conical portion will have the effect of at all times keeping the ring which holds the pneumatic cushion, hereinafter referred to, centered relative to the hub and the inwardly extending flanges 7 and 8 forming bearings upon the conical portion of the hub and the wedge shaped ring prevent the binding of the ring upon the hub, thus reducing the friction to a minimum. The periphery of the bearing ring has a circumferential groove, dovetailed in cross section.

A pneumatic cushion 9 is provided formed of an outer casing and an inner tube, substantially similar in construction to the pneumatic tire now in common use on automobiles and the outer casing has annular ribs on each side of the split or joint thereof which lock or engage in this dove-tailed groove in the manner of the ordinary automobile tire and said cushion is thereby held firmly upon the bearing ring. Closely surrounding this cushion and resting against the periphery thereof is the inner felly 10 which is circular in shape and formed of hollow metal. The inner side of this inner felly 10 is slightly convex so as to present a small bearing surface against the cushion thereby minimizing the friction and wear thereon. A plurality of spokes 11 radiate from this inner felly and the outer felly is carried by the outer end of said spokes. The outer felly and spokes are preferably formed of hollow metal and the spokes are formed integral with both the inner and outer fellies so as to form substantially a single member. The outer felly carries the rim 13 which in turn carries in the usual manner the tire 14 preferably formed of solid rubber or some other suitable material.

The numeral 15 refers to a metallic plate having a central orifice 16 through which the inner end of the hub 1 projects and the inner edge of this plate fits up closely against the flange 2 and is bolted thereto. The central portion of this plate is concaved and its outer edge or rim rests against the corresponding side of the inner felly 10. On the opposite side of the inner felly is a metallic ring 17. The portion of the plate 15 and likewise the portion of the ring 17 opposing the inner felly have shallow annular grooves 18 and 19 extending entirely around the same to permit the free circulation of a lubricant which may be introduced thereto as hereinafter explained, from which said lubricant finds its way to the internal and movable parts of the wheel. The inner felly has a plurality of transverse openings 20 therethrough, square in cross section and arranged at a uniform distance apart therearound. These openings are preferably alined with the alternating spokes 11 and the rim of the plate 15 and the ring 17 are held clamped loosely against the sides of the inner felly by means of bolts 21 which extend through suitable orifices in said rim and ring and through the square openings 20. These bolts are secured in position by means of lock nuts 22. As will be observed from the drawings, the openings 20 are considerably larger than the bolts 21 so as to permit considerable play of the inner felly either radially, tangentially or circumferentially.

A cushioning device has been provided, as shown in Figs. 20 and 21, consisting of a square tubing 23 whose sides are, either separate or integral with each other and formed of thin flexible material, slightly concaved and lined with a thick tubing 24, preferably formed of asbestos or some similar material and bolted or otherwise fastened to the tubing 23. This cushioning device is of a size to fit closely in the square openings 20 and in length is equal to the thickness of the inner felly. When in position in said openings it is apparent that the bolts 21 will pass through the same and as the inner felly moves upon the bolts, the asbestos lining 24 will prevent any clashing of the metal and the flexible sides of the tubing 23 will minimize the shock upon the bolts 21. Instead of the cushioning device just described, a strong coil spring 25, preferably made of spring steel, which is oval in general contour, as shown, may be inserted in the openings 20, as is shown in Fig. 2, and the bolts 21 pass therethrough. In case the coil spring is used, glands, such as 26, should be inserted in each end thereof to form a bearing for said bolts and to hold the bolts centered relative to the spring. The wire of which this spring is made may either be round or square and the central portion of the spring is of such diameter as to fit snugly in the holes 20 and it is obvious that as the outer portion of the wheel moves relative to the central or hub portion, all of the bolts are brought into play at the same time and inasmuch as both ends of each spring have a certain amount of play relative to the central portion thereof the bolts are cushioned, each spring as a whole having a certain amount of lateral flexibility so that when the springs are relieved of the weight they will have the tendency to assume their original position and bring the hub back to its central position relative to the wheel. The hole through the inner felly for the reception of these springs may be square, round, hexagonal or of any other desired shape and it is further to be observed that this form of cushioning device may be used entirely or any individual wheel may be cushioned partly with the coil springs and partly with the cushioning device, shown in Figs. 20 and 21, as may be desired.

While in use, the pneumatic cushion 9 may become deflated from some accidental cause or otherwise and in such case it will be found desirable to lock the outer section to the center or hub section against movement so that the vehicle can be temporarily used until the pneumatic cushion can be replaced. For this purpose I have provided a plurality of transverse orifices 26' through the inner felly 10 which are arranged between the square openings 20 and alined with said orifices in the rim of the plate 15 are cuplike recesses 27 and alined therewith on the other side are the orifices 28 through the ring 17. The metal surrounding the orifices 28 is forced outwardly forming a tubular portion 29 which is internally threaded. In case of the deflation of the cushion 9, pins such as 30 may be inserted through the corresponding orifices 28 and 26, allowing their inner ends to seat in the recesses 27 and the outer and central sections of the wheel will be thereby locked together forming a rigid wheel. When the pins 30 are not in place, a lubricant may be introduced through the orifices 28 into the interior of the wheel and these orifices are at all times protected by means of plugs 31 which are screwed therein. The wedge shaped ring 3 is locked in position by means of the ring shaped nut 32 which is threaded on to the outer end of the hub 1 and abuts against the outer end of said ring 3.

For the purpose of protecting the pneumatic cushion I have provided a metallic plate 33 having a central orifice through which the outer end of the hub projects. When in position the inner edge of this plate rests against the nut 32. The inner edge of the ring 17 is turned outwardly and said out turned portion 34 has a plurality of slots 35 whose inner ends are extended circumferentially. The outer edge of the plate 33 is also turned outwardly, forming the flange 36 which has a plurality of studs 37 projecting outwardly therefrom and arranged in corresponding relation to the slots 35. When it is desired to place the plate 33 in position, it is first placed over the hub 1 and the studs 37 are forced into the slots 35 and the plate 33 then given a partial turn until said studs lock in said slots. A ring like nut 38 is then threaded over the outer end of the hub and locked firmly against said plate 33 which is, thereby held in fixed position. A hub cap is then screwed over the end of the hub and may be screwed up until it locks against the nut 38 and the interior of the hub is thus protected against sand, dirt and other foreign matter. The plate 33 serves only for the purpose of protecting the pneumatic cushion and in case it should become accidentally misplaced, would not materially affect the strength or resiliency of the wheel and is arranged so that it can be easily removed and quickly replaced in case access to the interior part of the wheel is desired.

For the purpose of inflating the pneumatic cushion a small tube 40 is provided which communicates with the inner tube of said casing and is controlled by a suitable valve in the ordinary manner. This tube extends out through a passageway 41 in the bearing ring and the ordinary air pump or other source of pressure may be made to communicate therewith and the cushion may be thereby inflated.

In operation the pneumatic cushion has a constant creeping action with reference to the hub and if this pneumatic tube contacted directly with the hub there would be a more or less constant bias strain or pull on the tube and as a consequence the tube would in a relatively short time be torn apart or become so distorted that it would be useless. It is for this reason that the bearing ring has been provided. This ring not only forms the means for holding the split portions of the casing in engagement with each other but it forms a bearing which rests upon and moves over the hub.

As before stated the tire has a constant creeping movement and this floating ring moves with the tire and bears upon the hub and the wedge shaped ring 5. This ring is, therefore, of great importance and is one of the main factors in making a resilient wheel of this type practical and it should be further noted that this floating ring with the pneumatic cushion applied thereon can be very easily placed in position on the hub by inserting the same thereover and then forcing the wedge shaped ring in its position, as hereinbefore explained, which may be securely locked by means of the ring shaped nut 32 and in case the lock nut 28 should become loose allowing the plate 33 to come off, the ring shaped nut 32 would still keep the pneumatic cushion in position, this avoiding all possible accidents. Furthermore the bearing ring is formed in two parts, 4 and 5, secured together by set screws 6 and by removing said set screws the parts 4 and 5 may be separated and the pneumatic cushion readily disengaged from the bearing ring.

The construction herein described and claimed will be found to be simple and inexpensive inasmuch as the outer felly, inner felly and spokes will be constructed of stamped steel, in two parts and then brazed or welded together so that they will all be integral and the balance of the structure will be made out of cast steel or any other suitable material, the features of simplicity and inexpensiveness in construction being the chief objects sought to be obtained.

In the accompanying drawings my invention is shown as applied to the driving wheel of an automobile, but I wish it to be understood that the invention is equally applicable to, and is also intended to be used on the other wheels as well.

While I have illustrated what I consider to be the preferred form of my invention and one which has proven to be thoroughly effective in practice, it is to be understood that I do not wish to be limited to the details of construction, nor to the precise arrangement of the parts, as it is obvious that many minor changes might be made without departing from the spirit of the invention, as embodied in the appended claims.

What I claim is:—

1. In a wheel of the character described, a hub, having its inner portion frusto-conical in form, the remainder of the hub being of uniform diameter, the intersection of the frusto-conical portion of the hub with the uniform portion thereof being defined by a shoulder, a wedge-shaped bearing ring surrounding the uniform portion of the hub and bearing against said shoulder, means for holding the ring in place, a floating bearing ring surrounding the hub and having an inwardly projecting flange at each end, the inner face of the flanges being beveled, said flanges resting respectively upon the frusto-conical portion of the hub and the wedge-shaped ring, said floating bearing ring being made in two sections, one of said sections being nearly the entire width of the floating ring, the other of said sections forming the end of said ring, screws holding said sections together, and a pneumatic cushion mounted upon the floating ring, the space defined by the inner face of the floating ring and the two flanges thereof forming an oil space.

2. In a wheel of the class described, a floating hub exteriorly screw threaded at its outer end and exteriorly suitable at an intermediately inwardly of its threaded portion and between its cylindrical portion and its other end being of conical formation, a conical collar removably fitted upon the cylindrical portion of the hub and engaging with the said conical portion thereof, a disc disposed to be supported upon the said conical surfaces, a cushion carried by said ring, means upon the hub coöperating with the said conical collar to hold the same in coactive relation to the conical portion of the hub, oppositely disposed casing plates mounted upon the hub outwardly of the major ends of the conical portions, one of said casing plates being removable, a rim section including a rim proper disposed between the said casing plates and resting upon the pneumatic cushion, and means connecting the rim section to the casing plates for limited radial movement relative thereto.

3. In a wheel of the class described, a floating hub, a rim disposed to surround the hub and supported for movement relative thereto, casing plates carried by the hub and between which the inner portion of the rim is located, bolts secured through the casing plates, the said rim being provided with sleeve portions through which the bolts extend and which are of a diameter greater than that of the bolts, and auxiliary cushioning means comprising springs of double spiral form fitted upon the said bolts and having their intermediate whirls coöperating with the walls of the sleeves.

4. In a wheel of the class described, an inner hub section, an outer rim section, a cushioning member interposed between the said hub and rim sections, spaced plates carried by the hub section between which the rim section is arranged to move, the rim section being provided with a series of openings having plane walls, bolts secured through the said plates and extending through the openings, and a cushioning member fitted in each of said openings and having yieldable hypocycloidal walls.

5. In a wheel of the class described, an inner hub section, an outer rim section, a cushioning member interposed between the said hub and rim sections, spaced plates carried by the hub section between which the rim section is arranged to move, the rim section being provided with a series of openings having plane walls, bolts secured through the said plates and extending through the openings, a cushioning member fitted in each of said openings and having yieldable hypocycloidal walls, and a yieldable lining for the said walls.

6. In a wheel of the class described, a hub exteriorly conical adjacent one end and adjacent the minor end of its conical portion being exteriorly cylindrical, a conical collar removably fitted upon the cylindrical portion of the hub with its minor end located at the minor end of the conical portion of the hub, a bearing ring fitted upon the conical portion of the hub and upon the said conical collar, and means upon the hub bearing against the major end of the collar and holding the same firmly in engagement within the bearing ring, a cushion supported upon the ring, and a floating rim section supported upon the cushion.

In testimony whereof I have signed my name to this specification in the presence of two subscribing witnesses.

MARTIN F. KETTLER.

Witnesses:
M. Montgomery,
H. E. Storey.